United States Patent [19]
Cadd et al.

[11] Patent Number: 5,528,622
[45] Date of Patent: Jun. 18, 1996

[54] COMMUNICATION SYSTEM HAVING CHANNEL HOPPING PROTOCOL AND MULTIPLE ENTRY POINTS

[75] Inventors: Jimmy W. Cadd, Coral Springs; Robert J. O'Dea, Ft. Lauderdale, both of Fla.

[73] Assignee: Motorola, Inc., Schaumburg, Ill.

[21] Appl. No.: 315,058

[22] Filed: Sep. 29, 1994

[51] Int. Cl.$^6$ .................................................. H04B 1/713
[52] U.S. Cl. .......................... 375/202; 375/200; 380/34
[58] Field of Search .................................. 375/200, 201, 375/202, 203; 380/34; 455/33.1, 53.1, 54.1, 54.2; 379/58, 59, 60

[56] References Cited

U.S. PATENT DOCUMENTS

| | | | |
|---|---|---|---|
| 5,038,399 | 8/1991 | Bruckert | 455/33.1 |
| 5,212,831 | 5/1993 | Chuang et al. | 455/54.1 |
| 5,239,673 | 8/1993 | Natarajan | 455/33.1 |
| 5,257,398 | 10/1993 | Schaeffer | 455/33.1 |
| 5,355,516 | 10/1994 | Herold et al. | 455/54.2 X |

*Primary Examiner*—Bernarr E. Gregory
*Attorney, Agent, or Firm*—Andrew S. Fuller

[57] ABSTRACT

A communication system (100) operates on a system acquisition channel, and a set of communication channels organized into a sequence (200) which includes a set of reservation channels (202, 204) selected from the sequence (200). The system (100) includes a communication unit (113) which initiates communications by selecting one of the reservation channels (610), and by executing a collision detection protocol on that reservation channel (620). When no collision is detected, the initiating communication unit transmits, on the system acquisition channel, call information, including information for another reservation channel selected from the reservation channels (530).

9 Claims, 7 Drawing Sheets

COMMUNICATION SYSTEM HAVING CHANNEL HOPPING PROTOCOL AND MULTIPLE ENTRY POINTS

TECHNICAL FIELD

This invention relates in general to a radio communication system, and more particular, to a radio communication system having communication devices operating over shared communication channels.

BACKGROUND OF THE INVENTION

Radio communication systems which support communication among several users operating in a wireless environment over radio frequencies are known. The frequencies used by these systems are a subset of the radio frequency spectrum which are organized into one or more radio communication channels, such as frequency channels. In such a system, for example, a communication link may be established between groups of communication devices within the radio system. The communication link is established over one or more frequency channels for the duration of the communication. Generally, the frequency spectrum available for a given radio system is a limited communication resource, and several users may be competing for this resource. Thus, a radio communication system typically employs a frequency management methodology in order to maximize the efficient use of the available frequencies, and to minimize interference among users. This approach is essential where multiple communication links must be established over shared communication channels.

Many frequency sharing methodologies are known in the art. Examples include, channel hopping, direct sequence spread spectrum, time division multiplex, and other similar schemes. Most prior art frequency sharing methods employ an infrastructure to manage the operational aspects of a radio communication system. An infrastructure typically includes a base station, or some other type of controller, which manages frequency assignments, user access, collision detection and resolution, and other operational aspects of a radio system. These controllers tend to represent a significant cost in the establishment of a radio communication system.

Low cost radio communication systems which do not require an infrastructure are becoming an increasingly important segment of the wireless communication market. These low cost systems must also successfully manage frequency allocation among users in order to maximize efficiency and throughput. In a system incorporating a channel hopping protocol and using a large number of communication channels, issues such as system access time, channel collisions, and reliable system operation over a wide coverage area have increased significance. It is desirable to have a low cost radio communication system which promotes efficient use of shared communication resources, and which addresses the concerns described above.

SUMMARY OF THE INVENTION

The present invention provides for a communication system that operates using a channel hopping protocol which includes multiple entry points for system acquisition. The communication system has a system acquisition channel, and a set of communication channels organized into a sequence, which includes a set of reservation channels selected from the sequence. The system includes a communication unit that initiates communications by selecting one of the reservation channels, and by executing a collision detection protocol on that reservation channel. When no collision is detected, the initiating communication unit transmits, on the system acquisition channel, call information, including information for another reservation channel selected from the set of reservation channels.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Figure 1:
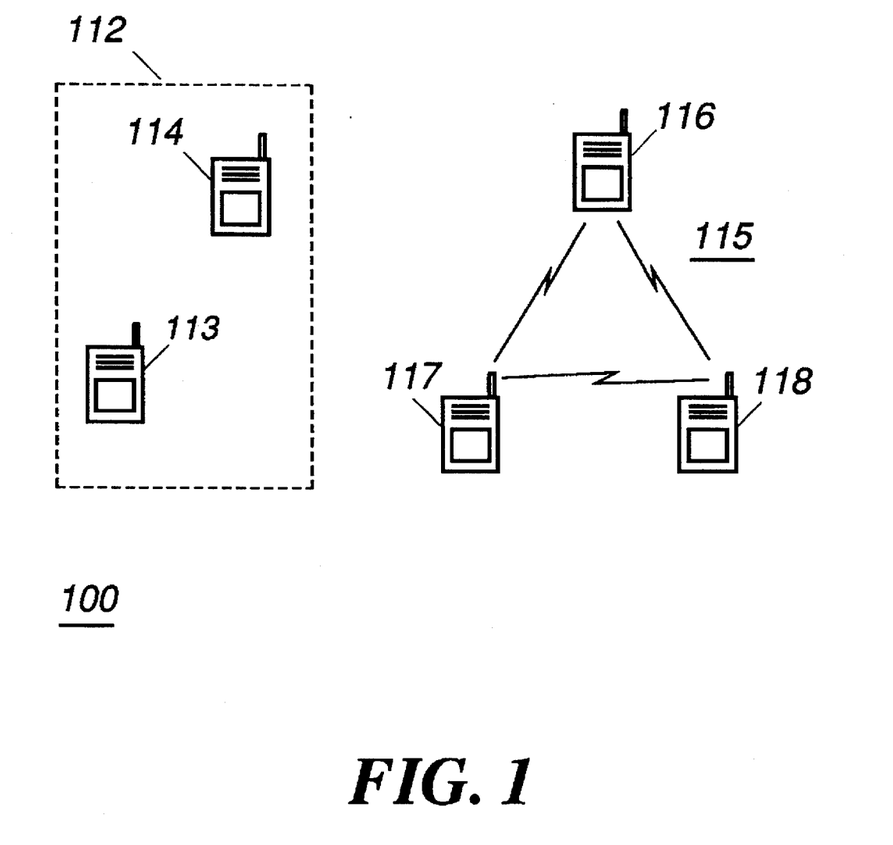
FIG. 1 is a radio communication system having communicating units operating on shared communication channels, in accordance with the present invention.

FIG. 1 shows a radio communication system 100 having communication units operating under a channel hopping protocol on shared communication channels, in accordance with the present invention. In the preferred embodiment, the communication units are two-way portable radio transceivers capable of establishing radio frequency RF communication links. Other types of communication devices may be used such as mobile radios, base stations, and the like. The radio system 100 has a first group 115 of communicating units 116, 117, 118 and second group 112 of units 113, 114 in the process of establishing communications. The radio communication system is self-organizing and operates without infrastructure support, such as would be provided by a controller or a base station. The present invention provides for improved efficiencies in operation of the radio communication system by reducing system access time, by simplifying channel collision detection, and by improving reliability in system operations.

The infrastructureless radio system includes a set of communication channels organized into a sequence, a set of system acquisition channels or connect channels, and a channel management protocol. The channel management protocol includes procedures for accessing and using the communication channels of the sequence. The channel management protocol incorporates a channel hopping protocol, including a defined channel hop period for channel hopping through the sequence of communication channels. The channel hop period is the duration of time a communication unit or group of communication units, may spend continuously utilizing a given communication channel. Communication units communicate on the sequence within a communication slot. A communication slot is generally a time slot, having duration less than or equal to the hop period, which cycles through successive channels of the sequence of communication channels at a rate governed by the channel hop period.

Figure 2:
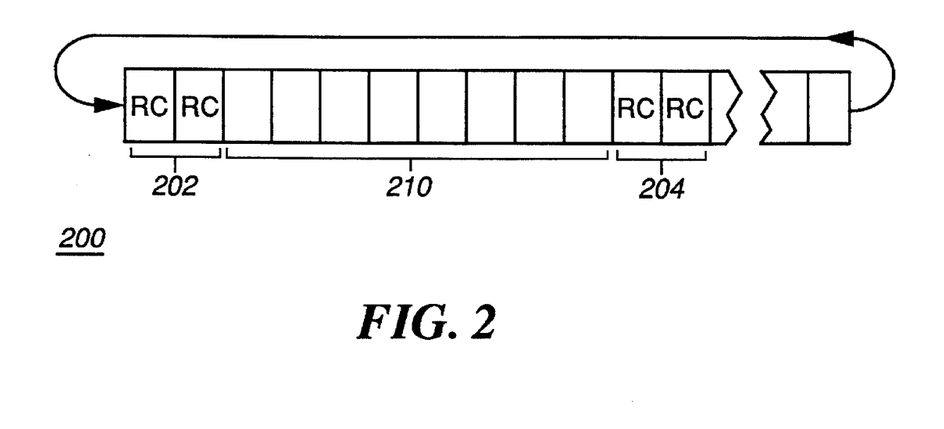
FIG. 2 is a block representation of a sequence of communication channels, in accordance with the present invention.
Figure 3:
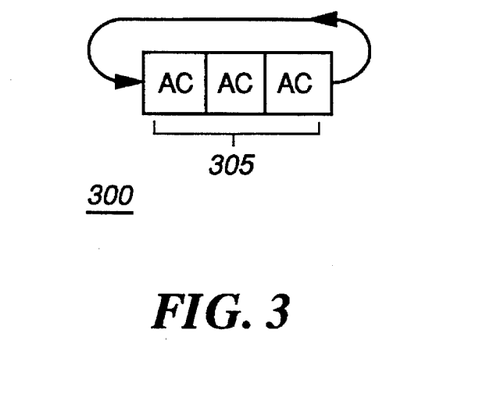
FIG. 3 is a block representation of a set of system acquisition channels, in accordance with the present invention.

FIG. 2 is a block representation of a sequence of communication channels 200, and FIG. 3 is a block representation of a set of system acquisition channels 300, in accordance with the present invention. Referring to FIG. 2 and FIG. 3, the set of system acquisition channels includes one or more communication channels which are monitored by potential participants of the radio communication system. The acquisition channels may be organized similar to the communication channels of the sequence. In the preferred embodiment, the communication channels comprise a plurality of frequencies organized into a sequence of frequency channels. A communication channel may comprise one or more frequency channels, such as a transmit and a receive frequency pair or a similar grouping. The number of communication channels may number into the hundreds or even thousands. The present invention is particularly suitable for sequences having a large number of communication channels wherein the channel hop period is short. When a short channel hop period is specified, the present invention further contemplates the designation of some of the communication channels of the sequence for handshaking and other signalling purposes. Access to the sequence of communication channels is managed using a set of reservation channels 202, 204. The reservation channels represent multiple entry points to the radio communication system. Generally, a reservation channel is used to facilitate maintenance of a communication slot on the sequence of communication channels, and to facilitate system acquisition using a collision detection procedure. The reservation channels are selected from the sequence and are distributed throughout the sequence, i.e., interspersed between channels used for normal voice and/or data communications 210. Preferably, the reservation channels 202, 204 are pairs of communication channels adjacent in the sequence, to provide for frequency diversity during collision detection. In the preferred embodiment, the reservation channel is not used for standard data communication.

A communication unit wishing to participate in the radio system uses a reservation procedure to secure a communication slot on the sequence. Before establishing the communication link, an initiating communication unit must perform system acquisition, i.e., acquiring a communication slot on the sequence. Communication units wishing to acquire or maintain a communication slot must transmit a reservation signal on a reservation channel. Preferably, the reservation signal is transmitted such that it has an extended communication range, or a transmission range, beyond that of the communication range of signals on the other communication channels of the sequence. This may be accomplished by lowering data transmission rates, by providing more robust transmit signals, by increasing the transmit power, or otherwise. The extended range offers additional protection from potential interferers operating outside the normal communication range of a member of the radio communication system.

Figure 4:
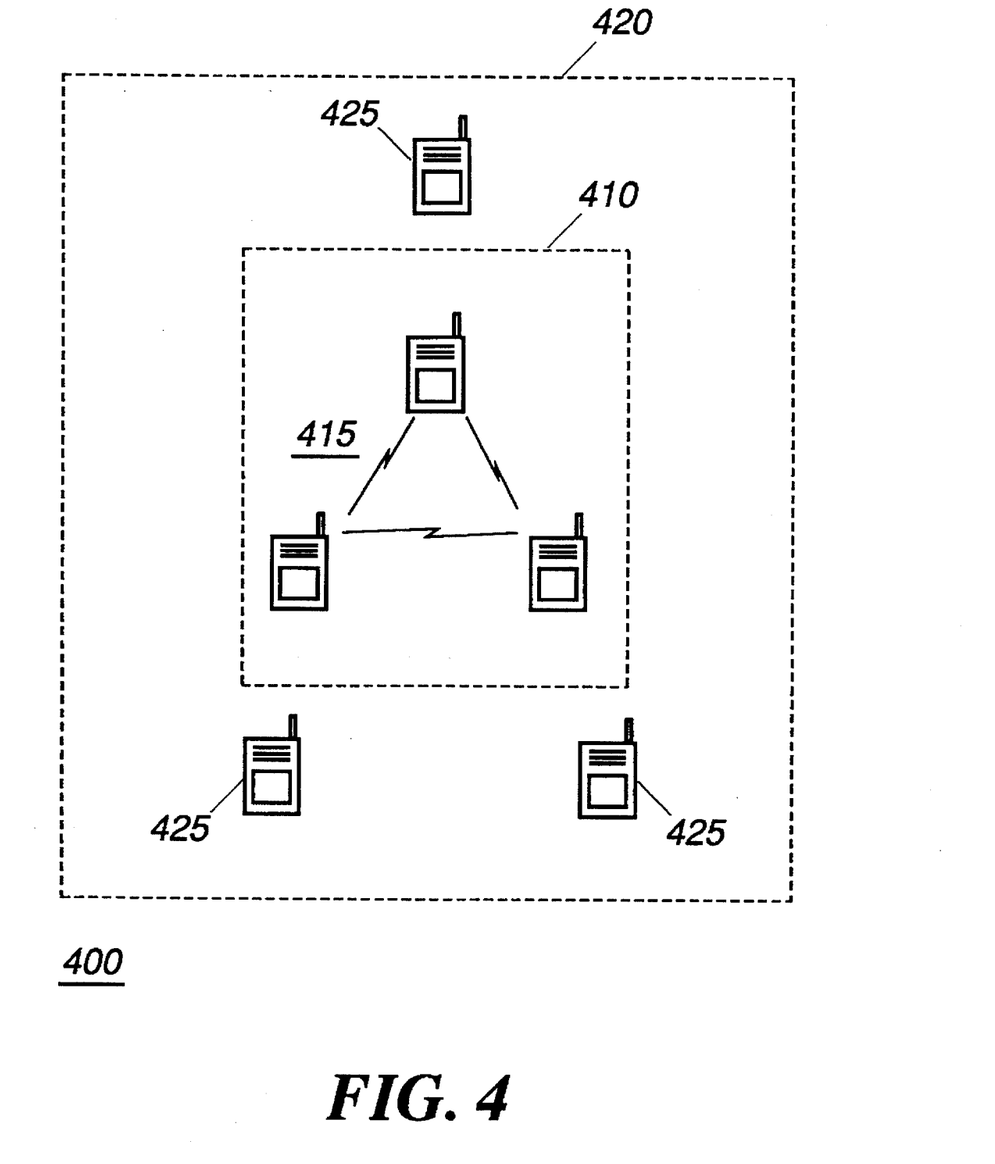
FIG. 4 is a block diagram illustrating the use of extended range on a reservation channel, in accordance the present invention.

FIG. 4 shows a block diagram 400 illustrating the use of the extended range on the reservation channel, in accordance with the present invention. A communicating group 415 has a particular coverage range 410 during normal data communications. When the communicating group 415 operates on a reservation channel, such as to preserve a communication slot on the sequence, the extended range transmissions of the communication group 415 creates an extended coverage range 420. The extended coverage allows the communicating group 415 to be visible to other communication units 425 outside the normal data communication range 410, which reduces the probability that these communication units 425 will attempt to establish communication which interferes with the communicating group 415. In the present invention, a communicating group in the process of establishing a communication link executes a collision protection procedure over the extended coverage range 420.

Figure 5:
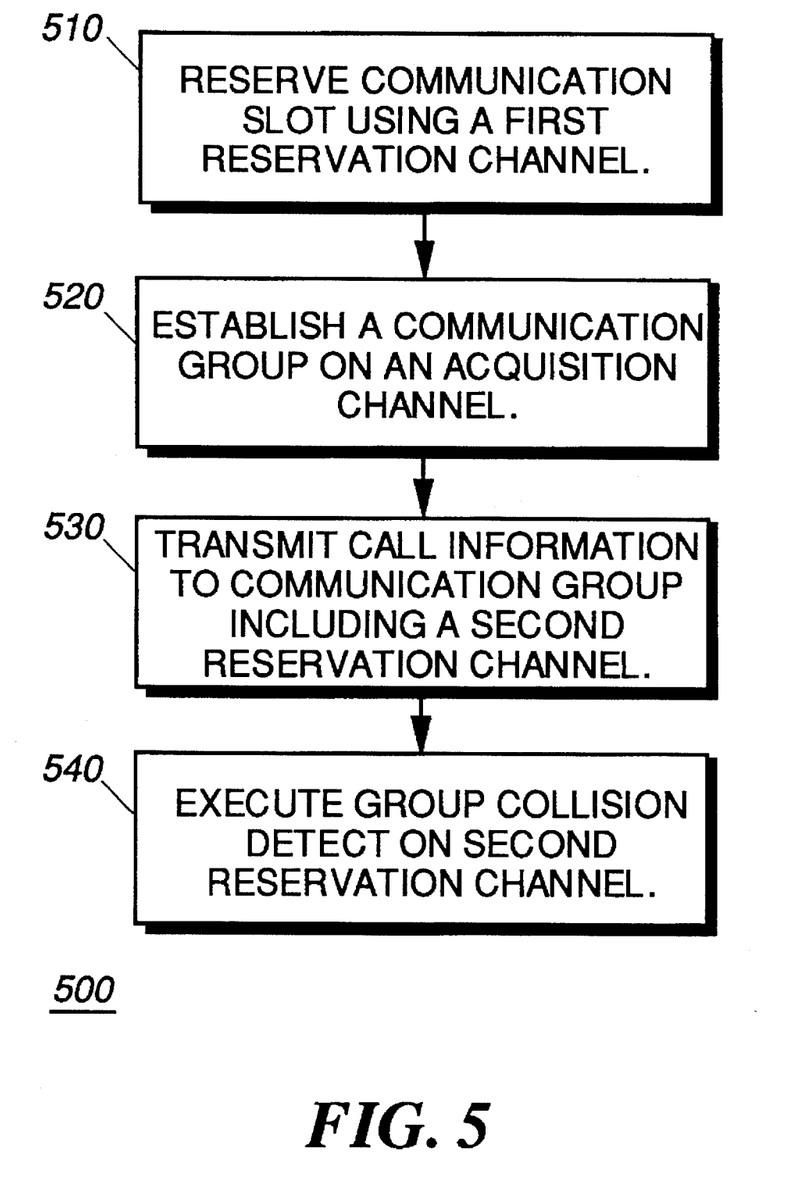
FIG. 5 is a summary of procedures used in establishing a communicating link within the radio communication system, in accordance with the present invention.

A communicating group is formed when an initiating communication unit 113 establishes communication with one or more target communication units 114. The members of the communicating group, then cooperate to complete the establishment of a communication link on the sequence of communication channels. Generally, the operating parameters of the radio communication system are known to each communication unit wishing to participate in the radio communication system. The parameters include the channel hop period, the identification of the sequence of communication channels and the reservation channels contained therein, and the various protocols used in establishing and maintaining communication on the sequence of communication channels. FIG. 5 shows a summary of procedures 500 used in establishing a communicating link within the radio communication system, in accordance with the present invention. To use the sequence of communication channels, the communication unit must first obtain a communication slot. An initiating communication unit reserves a communication slot on the communication sequence using a reservation channel selected from the reservation channels of the sequence, step 510. The communication slot reservation process is described in more detail below.

After reserving a communication slot, the initiating communication unit establishes a communicating group on an acquisition channel, step 520. The initiating communication unit monitors the set of acquisition channels to detect an open channel, and transmits call information to potential members of a communication group, step 530. The call information includes identification information for target communication units, information pertaining to a second reservation channel, and other information needed to synchronize and otherwise facilitate communications on the sequence of communication channels. The initiating communication unit may continue to transmit call information on the acquisition channel until appropriate responses, such as acknowledgments, are received from target communication units. All communication units not engaged in conversations, and which are ready to receive communications, monitor the acquisition channels for call information. Thus, target communication units monitoring the acquisition channels receive call information transmitted by the initiating communication unit and, together with the initiating communication unit, assemble into a communicating group. The members of the communicating group have access to information on a particular code word, the second reservation channel, and a time at which the second reservation channel is scheduled to have an open communication slot. The communicating group uses the code word and time information to execute collision detection on the second reservation channel. Each member of the communicating group executes, in conjunction, the collision detection protocol described below (see discussion on FIG. 7) using the particular code word. Any member of the communicating group may detect a collision which may ultimately cause the termination of communications on the sequence of communication channels. The effect of having multiple communication units performing collision detection is to enhance visibility of all the members of the communication group within the system. Thus, an extended coverage range, incorporating the extended range of each member of the communicating group is monitored for potential interferers.

Figure 6:
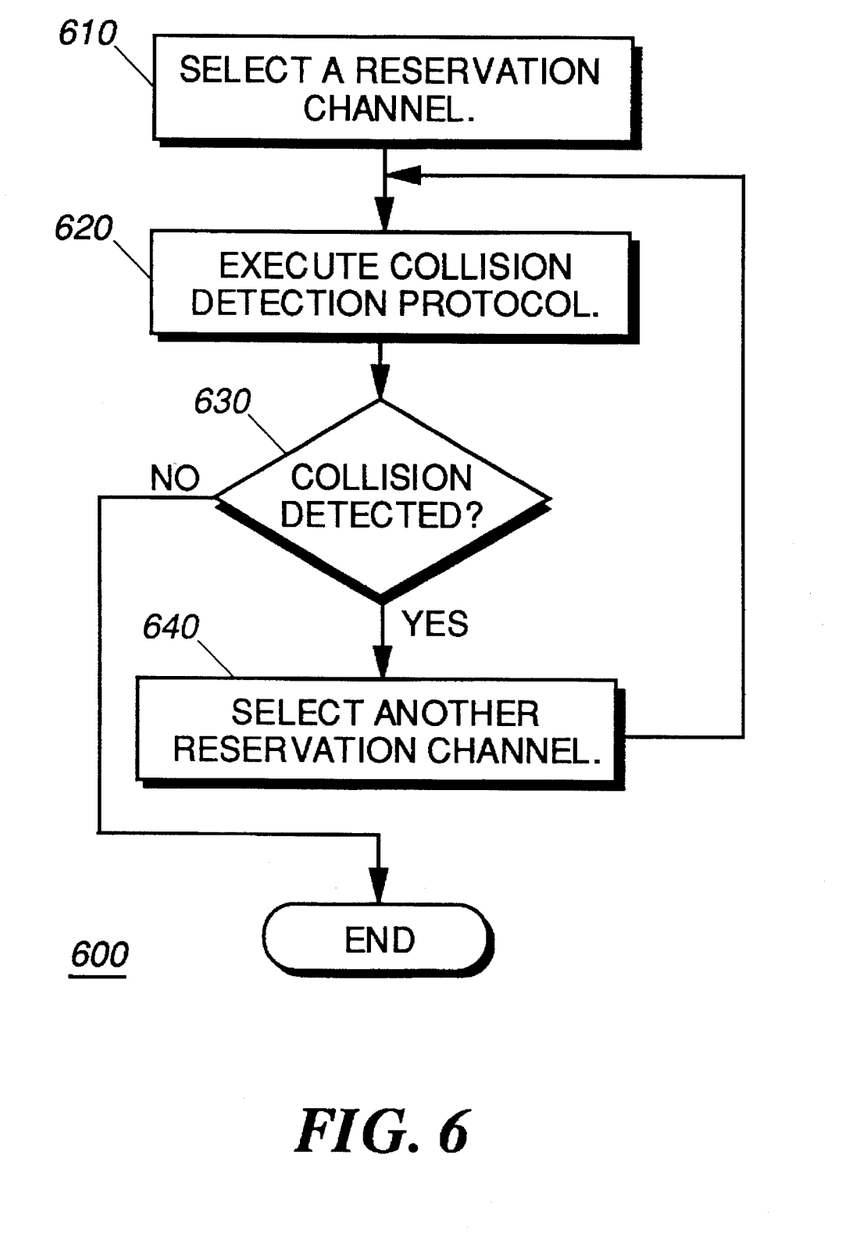
FIG. 6 is a summary of procedures used in a communication slot reservation process, in accordance with the present invention.

FIG. 6 shows the communication slot reservation process 600 in more detail. The initiating communication unit selects an arbitrary reservation channel from the set of reservation channels of the sequence, step 610. The initiating communication unit then executes a collision detection protocol on the reservation channel to determine whether the reservation channel is already occupied by a previously established communication group, by a communication group in the process of being formed, by another initiating communication unit, or otherwise. The procedure to execute the collision detection protocol is described in more detail below. Preferably, collision detection is performed successively on the reservation channels within a pair of reservation channels. The use of more than one reservation channel in succession to execute the collision detection protocol enhances the reliability of the collision detection scheme in that there is frequency diversity among the successive reservation channels. Consequently, a collision not detected because of interference in one reservation channel may be detected in the successive reservation channel. Different code words may be used in each of the successive reservation channels of the pair to further increase the likelihood of a collision. If a collision is detected on the reservation channel, step 630, the communication unit selects another reservation channel and executes again the collision detection protocol, steps 640, 620. This process is repeated until no collision is detected, indicating the likelihood of an open communication slot.

Figure 7:
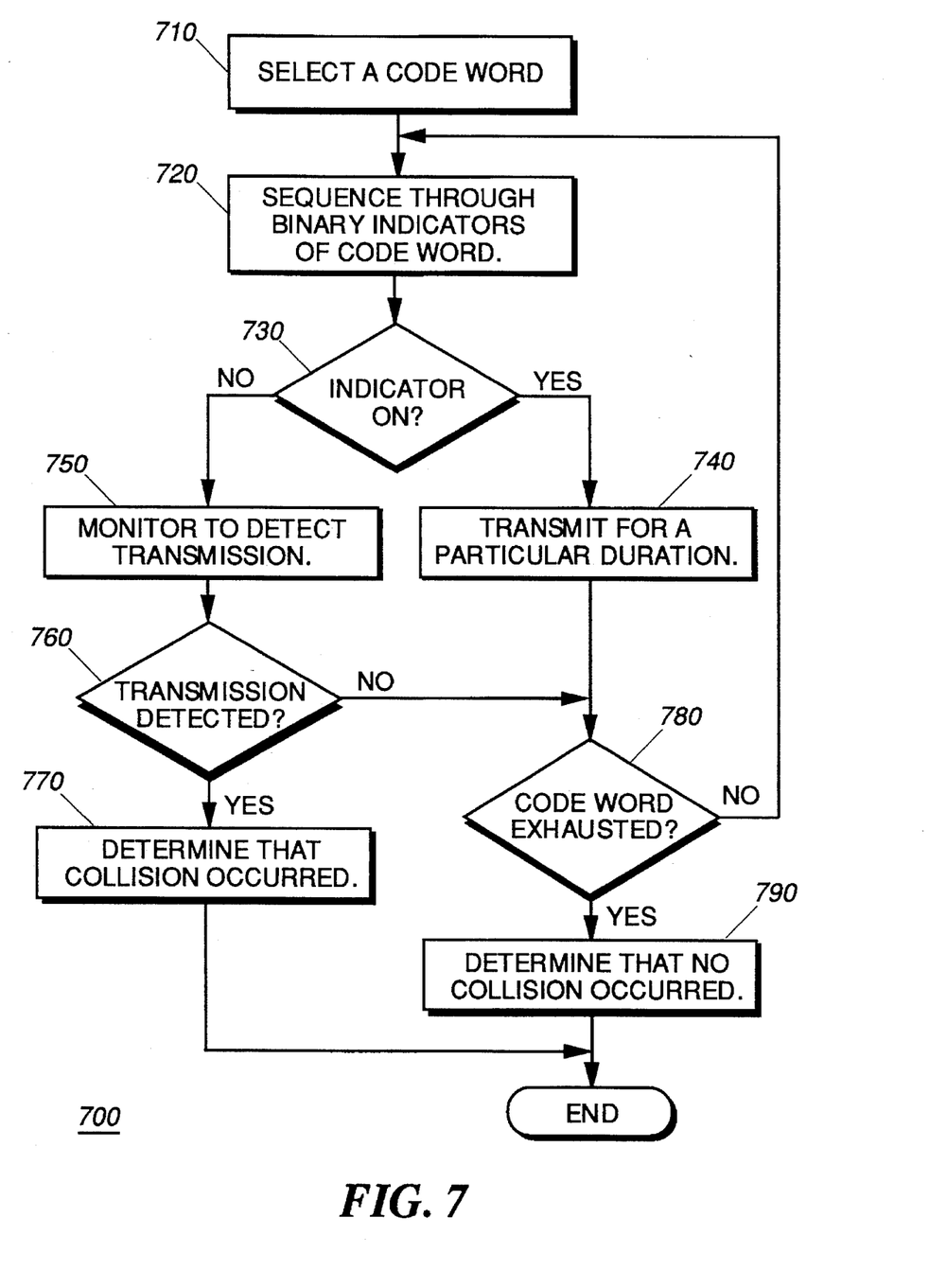
FIG. 7 is a summary of procedures used for executing a collision detection protocol, in accordance with the present invention.

FIG. 7 is a summary of procedures 700 to execute the collision detection protocol. Under the protocol, a code word is selected to identify each communication unit wishing to initiate communications within the system, step 710. Preferably, each code word is randomly selected to be of a predetermined size. In the preferred embodiment, four-bit code words are used. The bits are binary indicators which the communication unit uses to determine when to transmit and when to monitor on the communication channel. During initial collision detection by an initiating communication unit on a reservation channel, the code word need only be known to the initiating communicating unit, and thus, may be different for each attempt at collision detection. During the latter phases of establishing a communication link, the initiating communicating unit conveys a code word to potential members of a communicating group, and this code word is used for a second phase of collision detection. After selection of a code word, the communication unit sequences through the binary indicators or bits, of the code word, and when the binary indicator represents ON, the communication unit transmits on the reservation channel for a particular time duration, steps 730, 740. When the binary indicator represents OFF, the communication unit monitors the reservation channel to detect a transmission, steps 730, 750. Generally, the reservation channel is segmented, at least in part, into predetermined time slots corresponding to the binary indicators of the code word. If a transmission is detected within a particular time duration, or time slot, the communication unit determines that a collision occurred on the reservation channel, steps 760, 770. If a transmission was not detected within the particular time duration, or time slot, and the code word has not been exhausted, the sequencing through the binary indicators of the code word continues, steps 760, 780, 720. This process is repeated until the code word is exhausted or there is a determination that a collision occurred. If the code word is exhausted, without detecting a transmission, the communication unit determines that no collision occurred, steps 780, 790.

Once a communicating group establishes a communication slot on the sequence of communication channels, the communicating group must continue to reserve the communication slot by transmitting a reservation signal on a reservation channel as the communication slot traverses the reservation channel. Each member of the communicating group transmits a reservation signal, preferably a code word where all the binary indicators represent ON, on each reservation channel when on the reservation channel. Such transmissions work in conjunction with the collision detection procedure described above to facilitate system acquisition.

Figure 8:
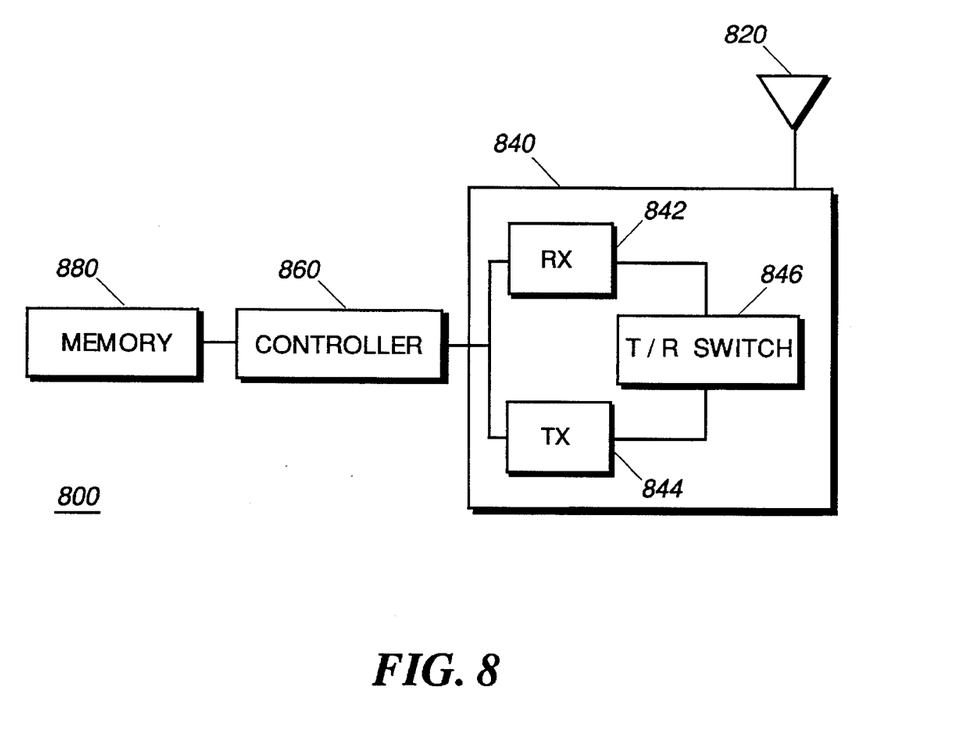
FIG. 8 is a block diagram of a radio capable of organizing a radio communication system, in accordance with the present invention.

FIG. 8 shows a block diagram of a radio 800 capable of organizing, or participating in, the radio communication system described above in accordance with the present invention. The initiating and target communication units described above are similarly constructed. The radio 800 is an electronic communication unit used for two-way communication, and is capable of receive and transmit operation using well known principles. A controller 860 uses logic and other information from an electrically coupled memory portion 880 to control the overall operation of the radio 800. The controller 860 is electrically coupled to an RF portion 840 which includes a receiver 842, and a transmitter 844. The RF portion 840 is electrically coupled to an antenna 820. For receive operations, communication signals are received by the antenna 820 and are selectively processed by the receiver 842. Similarly, for transmit operations, communication signals are processed by the transmitter 844 and radiated through the antenna 820. The transmitter 844 and receiver 842 operate under the control of the controller 860. According to the invention, the controller 860, cooperates with the memory portion 880, and RF portion 840, to perform the communication management protocol functions, including channel hopping and the system acquisition and communication slot reservation protocol described above.

The present invention provides for efficient system access in a radio communication system which incorporates a channel hopping protocol on a sequence of communication channels. Multiple reservation channels, preferably organized in pairs, are distributed throughout the sequence of communication channels. The multiple reservation channels provide for a reduction in system access time in radio systems having a large number of communication channels within the sequence. By organizing the reservation channels into adjacent pairs on the sequence, and by executing a collision detection protocol on successive adjacent reservation channels, frequency diversity is introduced thereby creating a more reliable collision detection scheme. Once a communicating group is assembled, such as on the system acquisition channel, the members of the communicating group complete the establishment of the communication link by executing together collision detection on a second reservation channel in the communication slot identified by the initiating communication unit. The execution of the collision detection protocol by all the members of the communicating group further extends the visibility of each member of the communicating group within the system. Thus, other potential communicating groups monitoring the activity on the sequence of communication channels are more likely to be aware of the presence of the members of the communicating group. This heightened visibility increases reliability of the system, as potential interferers located within the extended range of any member of the communicating group can be notified, via the reservation channel, of communication activity on the sequence.

What is claimed is:

1. In a communication system having a channel hopping sequence of communication channels, and having a channel hopping protocol defined for communicating on the sequence, the system having an initiating communication unit and a target communication unit, the system having a system acquisition channel to support establishing a communication link on the sequence between the initiating communication unit and the target communication unit, a method comprising the steps of:

selecting a plurality of reservation channels from the sequence, each reservation channel providing an entry point within the sequence for initiating communications on the sequence;

at the initiating communication unit:
        selecting a first reservation channel from among the plurality of reservation channels;
        executing a collision detection protocol on the first reservation channel; and
        transmitting call information, including information for a second reservation channel selected from the plurality of reservation channels, on the system acquisition channel, when no collision is detected.

2. The method of claim 1, further comprising the steps of:

receiving, by the target communication unit, the call information on the system acquisition channel; and     executing, by the initiating communication unit and by the target communication unit, a collision detection protocol on the second reservation channel.

3. The method of claim 2, wherein the step of selecting a plurality of reservation channels, comprises the step of:

distributing the plurality of reservation channels throughout the sequence.

4. The method of claim 2, wherein the step of executing a collision detection protocol, comprises the steps of:

selecting a code word comprising a series of binary indicators representing ON and OFF;

providing a plurality of time slots on the first reservation channel corresponding to the binary indicators of the code word;

sequencing through the code word and corresponding time slots;

transmitting during a time slot when a binary indicator of the code word represents ON;

monitoring for a transmission during a time slot when a binary indicator of the code word represents OFF;

determining that a collision occurred when a transmission is monitored; and     determining that no collision occurred when no transmission is monitored.

5. The method of claim 2, wherein the step of transmitting call information, comprises the step of:

transmitting a code word corresponding to the initiating communication unit.

6. The method of claim 5, wherein the step of executing, by the initiating communication unit and by the target communication unit, a collision detection protocol on the second reservation channel, comprises the step of:

transmitting and monitoring, on the second reservation channel, based at least in part on characteristics of the code word corresponding to the initiating communication unit.

7. The method of claim 1, wherein the step of selecting a plurality of reservation channels, comprises the step of:

forming a pair of reservation channels from two communication channels that are adjacent in the sequence.

8. The method of claim 7, wherein the step of executing a collision detection protocol on the first reservation channel, comprises the step of:

successively executing the collision detection protocol on each reservation channel of the pair of reservation channels.

9. A method of operating a communication system having a channel hopping sequence of communication channels, and having a channel hopping protocol defined for communicating on the sequence, the system having an initiating communication unit and a target communication unit, the system having a system acquisition channel to support establishing a communication link on the sequence between the initiating communication unit and the target communication unit, the method comprising the steps of:

forming a plurality of reservation channel pairs from pairs of adjacent communication channels distributed throughout the sequence at the initiating communication unit:

selecting a code word comprising a series of binary indicators representing ON and OFF;

selecting a first reservation channel from among the plurality of reservation channel pairs;

executing a collision detection protocol on the first reservation channel based at least in part on the code word, the collision detection protocol including:

sequencing through the binary indicators of the code word;

transmitting for a first predetermined time period, when a binary indicator of the code word represents ON;

monitoring for a second predetermined time period to detect a transmission, when a binary indicator of the code word represents OFF;

determining that a collision occurred when a transmission is detected;

determining that no collision occurred when no transmission is detected;

transmitting call information on the system acquisition channel, including information for a second reservation channel selected from the plurality of reservation channel pairs, and a code word corresponding to the initiating communication unit, when no collision is detected;

receiving, by the target communication unit, the call information on the system acquisition channel; and     executing on the second reservation channel, by the initiating communication unit and by the target communication unit, the collision detection protocol using the code word corresponding to the initiating communication unit.

\* \* \* \* \*